March 17, 1964 L. PÉRAS 3,125,332
DEVICES FOR CONNECTING THE WHEEL ARM TIE ROD
TO THE FRAME OF AN AUTOMOBILE VEHICLE
Filed Nov. 7, 1960
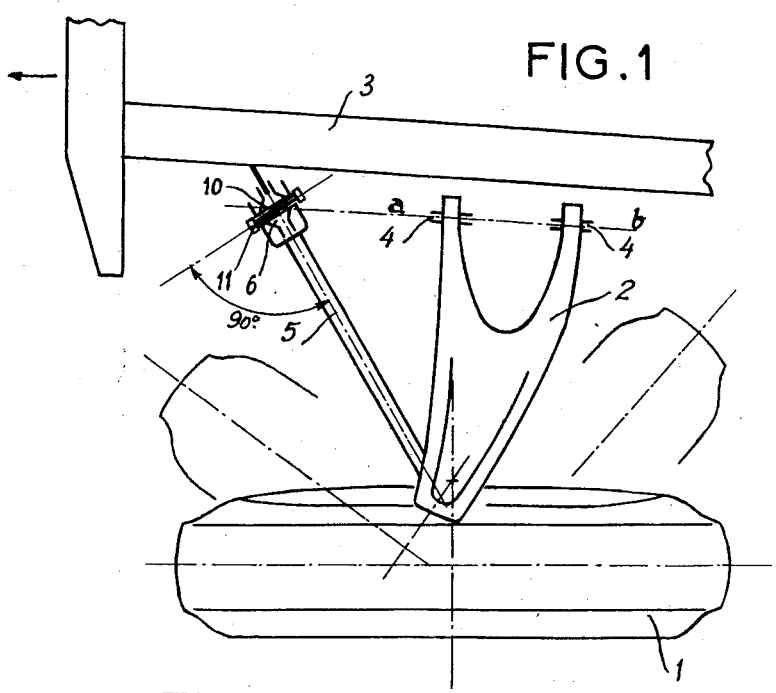
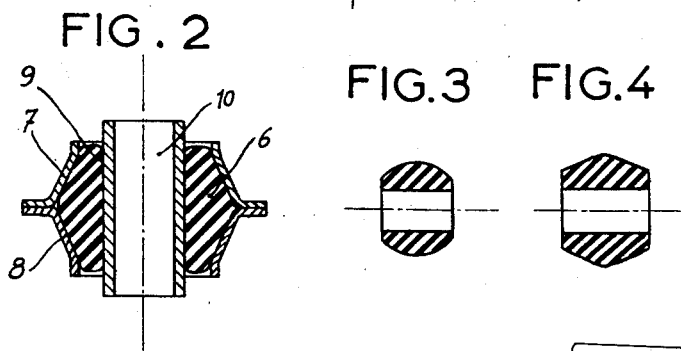
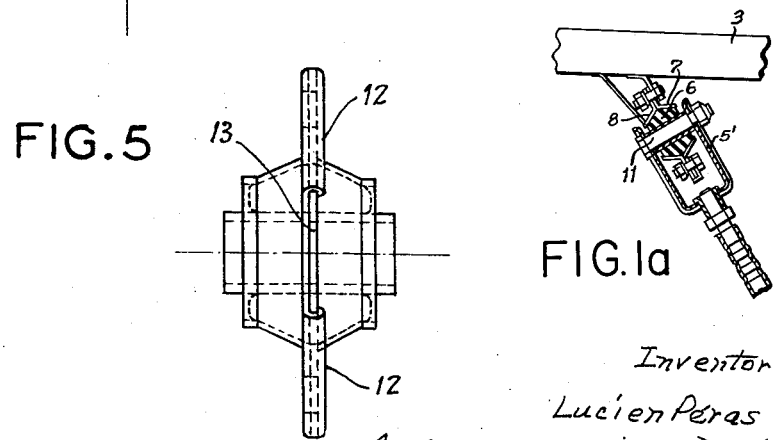
Inventor
Lucien Péras
By Stevens Davis Miller & Mosher
Attorneys 3,125,332
DEVICES FOR CONNECTING THE WHEEL ARM TIE ROD TO THE FRAME OF AN AUTOMOBILE VEHICLE
Lucien Péras, Billancourt, France, assignor to Regie Nationale des Usines Renault, Billancourt, France
Filed Nov. 7, 1960, Ser. No. 67,775
Claims priority, application France Nov. 6, 1959
1 Claim. (Cl. 267—15)

This invention relates to automobile chassis frames and has specific reference to devices for connecting the tie rod of the stub-axle supporting wheel arm to the chassis frame of an automobile vehicle. It is the essential object of this invention to provide an assembly device for connecting the tie rod of the pivot arm supporting the wheel stub axle to the chassis of an automobile. This tie rod is connected at one end to the wheel arm through a pivot pin and at the other end to the chassis by means of a resilient device secured at a point located on the extension, in the forward direction, of the inner pivot axis of the wheel arm, by means of a pin or bolt extending at right angles to the tie rod and therefore obliquely with respect to the aforesaid wheel arm inner pivot axis. As a result, the movement of rotation of the tie rod about the point of attachment thereof is spherical. The resilient device consists of a rubber bushing or block of adequate configuration which is caused to adhere on an inner metal tube, clamped between two pressed sheet-metal shells secured on the frame.

In order to afford a clearer understanding of this invention and of the manner in which the same may be embodied in practice, reference will now be made to the accompanying drawing illustrating diagrammatically by way of example a typical form of embodiment of the invention. In the drawing:

FIGURE 1 is a diagrammatic view from above showing the mounting of the device of this invention on an automobile chassis frame;

FIGURE 1a is an enlarged view showing the connection of one end of the tie rod to the resilient device;

FIGURE 2 is an axial section showing separately the structure of the resilient device without its companion tie rod and frame;

FIGURES 3 and 4 show alternate shapes of the resilient block, and

FIGURE 5 illustrates a resilient device in which the pressed sheet-metal shells are assembled by crimping.

Referring now to the drawing, the king-pin carrying the stub axle of the wheel 1 is carried in turn by an arm 2 having its other end pivotally mounted on the chassis frame 3 by means of pivot pins shown in diagrammatic form at 4. The arm 2 is further connected to the chassis by means of a tie rod 5 having its two ends pivoted on the arm 2 and chassis 3, respectively. At its chassis end the tie rod is connected thereto by means of a resilient device comprising a biconical rubber block 6 (FIGS. 1 and 2), made preferably of synthetic rubber to resist the destructive action of lubricating oil and grease. In the form of embodiment illustrated in the drawings by way of example, this rubber block is clamped or enclosed between a pair of pressed sheet metal shells 7, 8 having their registering edges assembled in any suitable manner. An axial bore 9 is formed through the rubber block 6 and the wall of this bore is caused to adhere through any suitable method to an inner metal tube 10 through which extends the assembly pin or bolt 11. Tie rod 5 has a cup-shaped or U-shaped member 5′ having diametrically located holes therein through which bolt 11 extends to secure tie rod 5 to the resilient device. Member 5′ can of course take any other desirable shape. It may be noted that this connecting pin or bolt 11 has its intermediate portion located on the extension of the axis a—b about which the inner end of arm 2 is pivotally mounted on the chassis, and that this pin or bolt extends at right angles to the tie rod 5, as desirable to ensure satisfactory displacement of the suspension system component elements.

FIGURE 2 illustrates the details of the resilient connection and in this typical form of embodiment the rubber block is of biconical configuration. In the alternate form of embodiment shown in FIGS. 3 and 4 of the drawing the rubber blocks illustrated have a substantially spherical shape and a substantially sphero-conical shape, respectively.

FIGURE 5 illustrates the device of this invention wherein rubber block has a biconical configuration and is enclosed in pressed sheet metal shells having their edges 12—13 assembled by crimping.

The use of a rubber bushing connecting device according to this invention is characterized by many practical advantages which may be summarized as follows:

(i) The tie rod can perform any spherical movement of rotation about its point of attachment to the chassis.

(ii) The easier, simplex manufacture of a rubber bushing is attended by a lower cost.

(iii) The fitting and removal of the rubber resilient bearing for maintenance and replacement purposes is greatly facilitated.

(iv) Easy prestressing and prestressing adjustment of the resilient device by adequately clamping the two metal shells.

The rubber bushing may also be prestressed by more or less tightening the bolt for securing the device on the chassis. However, this prestressing may also be obtained by crimping the edges of the two shells, as shown in FIG. 5.

I claim:

A wheel suspension assembly for a motor vehicle having a chassis, comprising a wheel supporting arm supporting at one end a stub axle, means pivotally connecting the other end of the wheel arm to the chassis for vertical swinging movement of the wheel arm, a tie rod connected at one end to the wheel arm, a swivel joint connection between the other end of the tie rod and the chassis forward of the pivoted end of the wheel arm providing a spherical movement of rotation of the tie rod, said connection including a rubber block having a central bore, a tube fitted in said bore and fixedly secured to said bore, a pair of metal shells, means clamping said shells onto the block so the surface of said block is fixedly secured to the surface of said clamps to prevent relative movement between said surfaces, a connecting member scured to the said other end of the tie rod, a bolt passed through said tube and attaching said connecting member to the block and means connecting the shells to the chassis, the intermediate portion of the bolt being located on the extension of the axis about which the other end of the wheel supporting arm is pivoted on the chassis, said bolt extending at right angles to said tie rod and the rubber block being of such a shape to permit a spherical movement of rotation of said tie rod.

References Cited in the file of this patent

UNITED STATES PATENTS

| | | |
|---|---|---|
| 1,732,657 | Picquerez | Oct. 22, 1929 |
| 2,087,271 | Weiss | July 20, 1937 |
| 2,105,132 | Sohener | Jan. 11, 1938 |
| 2,233,191 | Arcier | Feb. 25, 1941 |
| 2,728,593 | Hutton | Dec. 27, 1955 |
| 2,753,225 | Gilmer | July 3, 1956 |
| 2,950,774 | Eyb | Aug. 30, 1960 |
| 3,006,672 | Bajer | Oct. 31, 1961 |

FOREIGN PATENTS

| | | |
|---|---|---|
| 481,337 | Great Britain | Mar. 9, 1938 |